Figure 1:
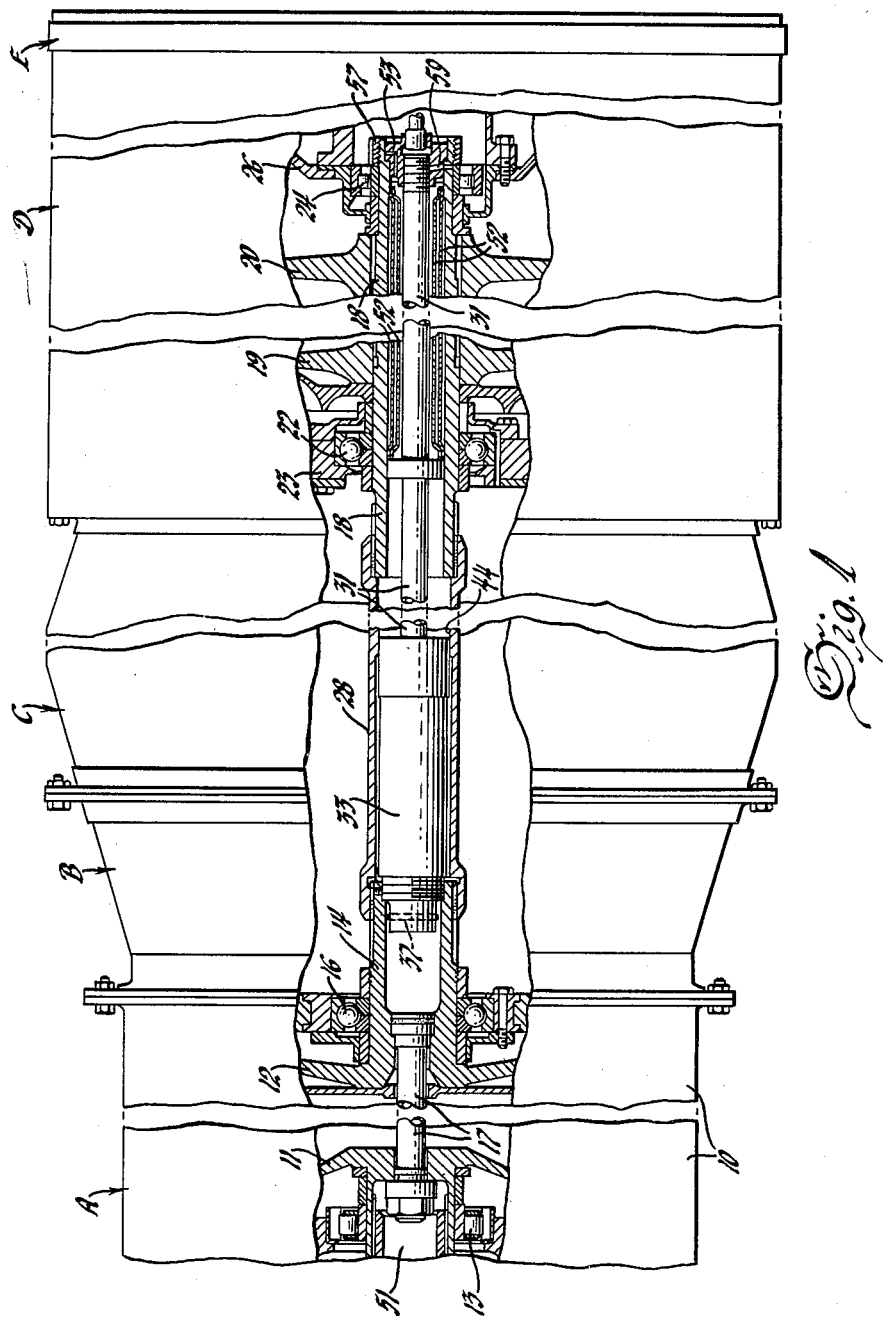

March 20, 1956 C. J. McDOWALL 2,738,920
GAS TURBINE ENGINE WITH THRUST BALANCING COUPLING
Filed Dec. 23, 1950 2 Sheets-Sheet 1

Inventor
Charles J. McDowall
By
Willits, Helwig & Baillio
Attorneys

March 20, 1956   C. J. McDOWALL   2,738,920
GAS TURBINE ENGINE WITH THRUST BALANCING COUPLING
Filed Dec. 23, 1950   2 Sheets-Sheet 2
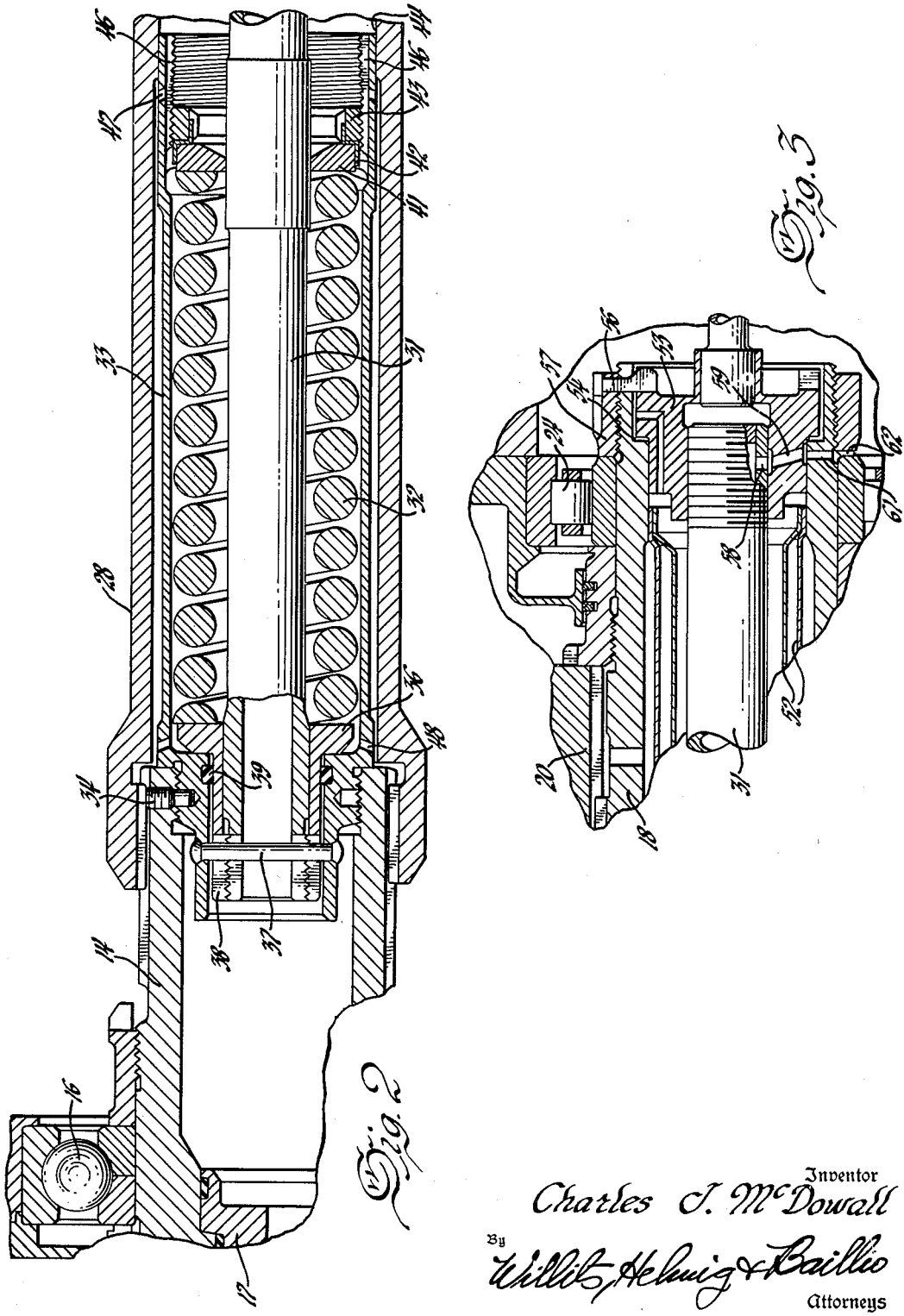
Inventor
Charles J. McDowall
By Willet, Helwig & Baillio
Attorneys

United States Patent Office 2,738,920
Patented Mar. 20, 1956

2,738,920

GAS TURBINE ENGINE WITH THRUST BALANCING COUPLING

Charles J. McDowall, New Augusta, Ind., assignor to General Motors Corporation, a corporation of Delaware Application December 23, 1950, Serial No. 202,553

17 Claims. (Cl. 230—116)

My invention relates to thrust balancing in rotating machinery and is most particularly directed to reduction of the thrust load on the bearings of gas turbine engines.

The invention will be explained and described herein in relation to its application to a gas turbine engine of the type including an axial-flow compressor and an axial-flow turbine coaxial with the compressor although, as will be apparent, the invention is susceptible of other applications.

Many turbo-machines, as for example, compressors and turbines of the axial-flow type, develop substantial end thrust when in operation; in other words, the rotor of the machine tends to move along its axis and must be restrained. Since no significant movement of the rotor axially of the stator can be tolerated, it is customary to provide a thrust bearing which receives the end thrust and locates the rotor axially of the stator.

It is desirable to reduce the load on the thrust bearing as much as possible so as to permit the installation of a bearing of lower capacity or to increase the life of the bearing in service. Because of the high temperatures encountered in gas turbines, and the necessarily compact design of aircraft gas turbines, the environment of the thrust bearings is not favorable to long life and is not adapted to the installation of very large bearings.

The discharge temperature of the compressor in such engines may reach 800° F., and the temperature of the gases flowing through the turbine is usually in the range from 1200° to 1600° F. While the bearings may be protected to some extent from the high temperatures, it is impossible to operate them at temperatures favorable to good lubrication and long endurance.

The end thrust of the compressor is normally in the direction of the intake and the end thrust of the turbine is normally toward the exhaust end. Therefore, if the flow through the two machines is in the same direction and they are coaxial, it is possible to couple the two rotors together so that the opposing ends thrusts are cancelled to some extent and only the difference between the thrusts must be provided for by thrust bearings. This scheme is readily workable in certain types of engines in which the stators of the compressor and turbine are maintained at a constant axial distance from each other. In typical aircraft gas turbine engines, however, the combustion apparatus is disposed between the compressor and the turbine, and thermal expansion of the combustion chamber may vary the distance between the turbine and compressor by as much as a quarter of an inch. If the combustion section itself does not constitute the frame joining the compressor and turbine, some other framework must be provided, and heat radiated from the combustion section in operation will increase the length of the engine frame.

Because of this variation in length of the engine, it is not feasible to couple the compressor and the turbine rotors rigidly together, since the expansion of the interconnecting shaft will vary from that of the structure joining the turbine and compressor stators. It has been common practice, therefore, to provide individual shafts for the compressor and turbine, with a thrust bearing for each, and a splined coupling between the two shafts to allow for expansion and contraction of the engine frame.

It is possible without too much difficulty to substantially balance the end thrust of the compressor by providing a balance piston, which may be the face of a compressor wheel, and biasing the piston by air bled from the compressor discharge. This type of solution is not readily applicable to gas turbines, however, because of the exceedingly high temperatures of the motive fluid, and is not satisfactory for high-pressure compressors for the same reason.

The magnitude of the problem may be indicated by the fact that the compressor and turbine end thrusts are calculated to be about 4200 pounds and about 5700 pounds, respectively, under full load conditions in a particular gas turbine rated at about 2500 horsepower. Since this engine operates at over 12,000 R. P. M., the burden on the thrust bearings, if not reduced, would be quite serious. It will be noted that the resultant of the two thrusts is only approximately 1500 pounds.

My invention is directed to a system and arrangement by which the opposed end thrusts of the turbine and compressor may be combined so that substantially only the resultant thrust, which is relatively small, must be withstood by the thrust bearings. The invention overcomes the difficulties presented by thermal expansion. The invention greatly reduces the load on the turbine thrust bearing and eliminates the need for a thrust-balancing air piston for the compressor, while maintaining a light load on the compressor thrust bearing.

This highly desirable result is achieved by coupling the two shafts together for transmission of end thrust from one to the other through a pre-loaded elastic member. Preferably, this comprises a coil spring mounted in the compressor or turbine shaft or the shaft coupling and maintained under initial tension. The spring is coupled to both rotors, a tie bolt or the like serving to couple it to the remote rotor. By this arrangement, a thrust opposing the end thrust of each rotor is applied to that rotor, and thermal expansion of the engine is accommodated by yielding of the spring.

A feature of the invention lies in the fact that the spring is bridled; that is, restrained against relaxation beyond a predetermined point, and is coupled to the rotors so that no end thrust is transmitted to the rotors when the engine is out of operation. The connection of the spring to the rotors embodies a small amount of lost motion or end play, which is taken up by expansion of the engine as soon as it warms up significantly after being put into operation. Thus the thrust bearings are not loaded when the engine is standing idle or being shipped, or when the engine is started. Elimination of the thrust load of the spring from the bearings when the engine is being started is desirable since the bearings are substantially dry at this time.

Unless means are provided to lubricate the bearings of a gas turbine engine before the starting cycle is initiated, the supply of lubricating oil to the bearings picks up gradually as the engine and the lubricating oil pump driven thereby are accelerated by the starter. Since pre-lubricating arrangements of the type referred to are burdensome, they are not ordinarily used; therefore, it is best to have no substantial load on the bearings until the engine has been brought up to a speed at which normal lubricating oil flow is provided.

The principal objects of the invention are to provide improved thrust balancing for gas turbine engines; to improve the thrust balancing of rotating machinery in general; to provide a thrust balancing system for gas turbine engines and the like which accommodates changes in dimensions of the engine; to provide thrust balancing without loading the bearings when the engine is idle or starting; to provide means for exerting a force on a rotor of a turbomachine which becomes operative only upon initiation of operation of the engine; to compensate thrust by elastic means mounted in the shaft of a turbomachine; to provide a thrust balancing apparatus activated by thermal expansion of a turbomachine; and to provide a thrust balancing apparatus which is simple, compact, reliable, and light in weight.

The succeeding detailed description of the preferred embodiment of the invention will make clear to those skilled in the art the advantages of the invention and the preferred mode of realization of the stated objects.

Referring to the drawings: Figure 1 is a longitudinal view of a gas turbine engine with certain parts shown in section along the axis of the engine; and Figures 2 and 3 are sectional views taken along the axis of the engine, to a larger scale than Figure 1.

The engine illustrated in Figure 1 is representative in its general arrangement of a well-known type of gas turbine engine intended for aircraft propulsion. The principal elements of the engine are an axial-flow compressor A, a midframe B which includes the outlet passage or diffuser of the compressor, a combustion section C, a turbine D, and an exhaust system E. The compressor is driven by the turbine, which furnishes additional power to drive an aircraft propeller or for other purposes. The air discharged by the compressor is heated by burning fuel in the combustion section C. The hot compressed gases drive the turbine D and are exhausted through the exhaust duct. Since the general nature of such engines is well understood by those skilled in the art to which the invention relates and the principles of the invention may be understood without references to details of the engine, the engine will not be described in detail herein in the interest of conciseness. The compressor A comprises a casing or stator 10 within which is mounted a rotor shown partially and comprising a plurality of wheels or disks, the forward wheel 11 and the final wheel 12 being shown. These wheels as is customary mount blades which cooperate with blades fixed in the stator to compress the air. The forward disk 11 comprises a stub shaft which is supported in a roller bearing 13 mounted in the forward end of the compressor frame. The rear disk 12 comprises a stub shaft 14 mounted in a ball thrust bearing 16 which may be supported in the compressor stator 10. The compressor wheels are held together by a tie bolt 17 to form a unitary rotating structure. Although a disk type of compressor rotor is illustrated, it will be apparent that the type of compressor rotor is immaterial so far as the invention is concerned.

The compressor A is bolted to the midframe B and the combustion section C is likewise bolted to the midframe and comprises a structural element or frame by which the turbine D is coupled through the midframe and combustion section to the compressor. The structural details of this frame are immaterial to the invention.

The turbine casing D contains the turbine nozzle ring and fixed vanes (not illustrated) and supports the turbine rotor shaft 18 on which one or more turbine wheels are mounted, such as wheels 19 and 20. The turbine shaft 18 is supported by a ball thrust bearing 22 mounted in a frame member 23 of the turbine and a roller bearing 24 likewise supported from the turbine stator. The bearing 24 is mounted in a bearing support ring 26 which is supported by a number of radial struts (not shown) extending through the exhaust passage of the turbine.

The turbine shaft 18 is coupled to the compressor shaft 14 by a hollow shaft or coupling member 28 which is internally splined at both ends to engage external splines on the shafts 14 and 18. The spline arrangement permits longitudinal displacement of the compressor and turbine due to expansion of the sections B and C of the engine.

A tubular tie bolt 31 (Figs. 1 to 3) extends from the compressor stub shaft 14 through the coupling member 28 to the rear end of the turbine shaft 18 to transmit end thrust between the rotors. The forward end of the tie bolt is urged forwardly by a coil compression spring 32 mounted in a spring housing 33 within the coupling shaft 28.

The spring housing 33 is threaded into the end of stub shaft 14 and locked by a setscrew 34. A collar 36 threaded onto the end of the tie bolt 31 forms one abutment for spring 32. When the engine is cold, this collar engages the forward end of the spring housing, as illustrated, to bridle the spring.

A transverse pin 37, which may be secured by upsetting the ends of the pin, passes through the end of the housing 33 and through slots 38 in the tie bolt 31 and collar 36, thus permitting axial movement of the tie bolt but preventing rotation relative to the stub shaft.

An O-ring 39 seals between the axially extending portion of collar 36 and the spring casing 33.

The rear end of spring 32 is held by an adjustable abutment 41 centered by a flanged sheet metal ring 42 and located by an externally threaded ring nut 43 received in the threaded rear end of casing 33. The rear end of casing 33 is piloted in a bore 44 of reduced diameter in the coupling shaft 28.

The spring housing is slotted as indicated at 46 for entrance of oil from the coupling shaft, and is provided with oil outlets 47 and 48 from which oil may pass to the splined coupling between shafts 14 and 28. This oil is scavenge oil from the turbine flowing through the hollow shaft 28.

Lubricating oil for the compressor and turbine bearings is delivered by a pump (not shown) to a chamber 51 at the forward end of the compressor, from which it flows through the tubular tie bolt 17, the hollow stub shaft 14, and the tubular tie bolt 31 to the turbine. The arrangement by which the oil is directed from within the shafts to the bearings is not material to my invention. The circulation of oil through the tie bolt is beneficial in that it acts to cool the tie bolt and limit its thermal expansion.

Within the turbine shaft 18, the tie bolt is additionally protected against heat transfer by tubular radiation shields 52 of bright metal defining annular dead air spaces within the shaft.

The rear end of tie bolt 31 is threaded to receive a flanged nut 53 which pilots into the bore of the shaft 18. This nut is run up on the tie bolt until just short of a tight fit with the engine cold, leaving a clearance indicated (and greatly exaggerated for clarity of the drawings) at 54.

A radial pin or key 56 locks the nut 53 and the retaining collar 57 of the after turbine bearing 24 in place.

Oil flows out of the tie bolt to the rear turbine bearing through radial passages 58 in the tie bolt, 59 in the nut 53, and 61 in the shaft 18, and through grooves 62 in the collar 57 to the rear bearing 24. This lubrication arrangement is indicated generally as illustrative of the provision for circulation of oil through the tie bolt.

Preferably, in assembling the engine, the tie bolt, loading spring 32, and casing 33 are assembled and the spring abutment 41 is adjusted to the desired tension. This subassembly is threaded into the stub shaft 14, and locked by the setscrew 34. The coupling member is slid over the tie bolt, the turbine is slipped over the tie bolt and fixed to the engine combustion section or frame, and the nut 53 is adjusted. The nut 53 may be run up to a snug position, then be backed off slightly to a locking point for insertion of the key 56.

The operation of the invention will presumably be clear from the foregoing, but may be outlined briefly.

When the engine is out of service, there is no thrust on the bearings 16 and 22. As the engine is accelerated by an external power source for starting, a small dynamic thrust is developed by the compressor and turbine rotors. When combustion is initiated, engine rotational speed and dynamic thrusts of the rotors develop rapidly.

The engine also heats rapidly due to combustion, and the resultant longitudinal expansion of the engine relative to the tie bolt draws the tie bolt rearwardly, pulling the collar 36 away from its position of rest against the interior flange of spring casing 33. The spring thrust is thus exerted rearwardly against the compressor rotor through the casing 33 and shaft 14, and forwardly against the turbine rotor through the tie bolt 31 and nut 53.

The spring readily yields to accommodate maximum engine elongation without significant increase in tension. The actual thrusts of the compressor and turbine vary with engine operating conditions, principally with the density of the air flowing into the compressor.

Despite these variations, and the inequality between compressor and turbine thrusts (which will vary with engine design), the spring 32 may be set to a tension which greatly reduces thrust load on the bearings 16 and 22 over the range of operating conditions encountered by the engine.

For example, if turbine thrust is 5700 pounds and compressor thrust 4200 pounds under full load conditions, a spring with a pull of 4000 pounds will reduce the thrust load on bearing 22 to 1700 pounds and that on bearing 16 to 200 pounds.

When the engine is shut down, the spring tension load is taken by the bearings for a short time until the engine cools, but this is not serious, both because of the short time interval and the cessation of rotation of the engine.

The description herein of the preferred embodiment of the invention is not to be considered as limiting the invention, as many variations in structure within the principles of the invention will be apparent to those skilled in the art.

I claim:

1. A turbomachine comprising, in combination, a stator, a rotor, a thrust bearing for the rotor on the stator, the turbomachine being adapted to develop an end thrust in operation and being subject to thermal expansion in operation, and means for opposing the end thrust so as to reduce the load on the thrust bearing comprising an elastic member and means for coupling the elastic member between the stator and rotor so as to be stressed by the said thermal expansion and so as to exert a thrust on the rotor when so stressed in opposition to the end thrust of the rotor.

2. A turbomachine as recited in claim 1 in combination with means for restraining relaxation of the elastic member beyond a predetermined point corresponding to a portion of the normal thermal expansion of the turbomachine.

3. A turbomachine as recited in claim 1 in which the coupling means provides a slight lost motion taken up in initial expansion of the engine from a cold condition.

4. A turbomachine comprising, in combination, a stator, a rotor, a thrust bearing for the rotor on the stator, the turbomachine being adapted to develop an end thrust in operation and being subject to thermal expansion in operation, and means for opposing the end thrust so as to reduce the load on the thrust bearing comprising an elastic member prestressed and bridled in the inoperative condition of the turbomachine, a tie member between the elastic member and the rotor extending through the rotor, means for cooling the tie member, and means providing a thrust connection from the elastic member to the stator.

5. A turbomachine comprising, in combination, a stator, a rotor, a thrust bearing for the rotor on the stator, the turbomachine being adapted to develop an end thrust in operation and being subject to thermal expansion in operation, means other than the said thrust bearing for opposing the end thrust to reduce the load on the thrust bearing, and means actuated by thermal expansion of the engine for actuating the said opposing means.

6. A turbomachine comprising, in combination, a stator, a rotor, a thrust bearing for the rotor on the stator, the turbomachine being adapted to develop an end thrust in operation and being subject to thermal expansion in operation, means other than the said thrust bearing responsive to operation of the turbomachine for exerting an end thrust on the rotor opposing the end thrust generated by the rotor to reduce the load on the thrust bearing, and means for maintaining the end thrust exerted by the said means substantially constant notwithstanding variations of thermal expansion of the engine.

7. A turbomachine comprising, in combination, a stator, a rotor, a thrust bearing for the rotor on the stator, the turbomachine being adapted to develop an end thrust in operation and being subject to thermal expansion in operation, means responsive to thermal expansion of the turbomachine beyond a predetermined magnitude for exerting an end thrust on the rotor opposing the end thrust generated by the rotor to reduce the load on the thrust bearing, and means for maintaining the end thrust exerted by the said means substantially constant notwithstanding additional thermal expansion of the engine.

8. A heat engine comprising, in combination, two turbomachines each including a stator and a rotor, the said rotors being coaxial, a thrust bearing for each rotor fixed to the corresponding stator, a frame connecting the stators, the turbomachines being disposed so that their end thrusts are opposed, and means responsive to operation of the engine for coupling the rotors for transmission of end thrust therebetween comprising an elastic member and means actuated by elongation of the engine due to thermal expansion in operation for loading the elastic member.

9. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, and means responsive to operation of the engine for coupling the rotors for transmission of end thrust therebetween comprising a bridled elastic member coaxial with the shafts, means coupling the elastic member to the said rotors, and means actuated by elongation of the engine for loading the elastic member, the last-named means being free in the inoperative condition of the engine and being stressed by expansion of the engine in operation.

10. An engine comprising, in combination, two turbomachines each including a stator and a rotor, the said rotors being coaxial, a thrust bearing for each rotor fixed to the corresponding stator, a frame connecting the stators, means coupling the rotors for rotation together, the turbomachines being disposed so that their end thrusts are opposed, and means responsive to operation of the engine for coupling the rotors for transmission of end thrust therebetween comprising a bridled elastic member and means actuated by elongation of the engine for coupling the elastic member to the said rotors.

11. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, and means responsve to operation of the engine for coupling the rotors for transmission of end thrust therebetween, the said means being inoperative in the inoperative condition of the engine and being activated by expansion of the engine in operation.

12. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, and means responsive to operation of the engine for coupling the rotors for transmission of end thrust therebetween comprising an elastic member stressed by thermal elongation of the engine.

13. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, and means responsive to operation of the engine for coupling the rotors for transmission of end thrust therebetween comprising a tie bolt, a lost motion connection coupling the tie bolt to one of the rotors, and a bridled elastic member coupling the tie bolt to the other rotor, so constructed and arranged that the lost motion of the said connection is taken up and the tie bolt is stressed by expansion of the engine in operation.

14. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, means responsive to operation of the engine for coupling the rotors for transmission of end thrust therebetween comprising a tie bolt loosely coupled to one of the rotors and a bridled elastic member coupling the tie bolt to the other rotor, so constructed and arranged that the tie bolt is stressed by expansion of the engine in operation, and means for circulating a fluid in contact with the tie bolt for cooling the tie bolt.

15. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, and tie means for coupling the rotors for transmission of thrust therebetween including elastic means yieldable to accommodate expansion of the engine.

16. A gas turbine engine comprising, in combination, a compressor including a stator and a rotor, a turbine including a stator and a rotor, the said rotors being coaxial, a thrust bearing for each rotor fixed to the corresponding stator, a frame connecting the stators, means coupling the rotors for rotation together, the turbine and compressor being disposed so that their end thrusts are opposed, and means responsive to operation of the engine for coupling the rotors for transmission of end thrust therebetween including means yieldable to accommodate thermal expansion of the engine.

17. A gas turbine engine comprising, in combination, a compressor including a stator and a rotor, a turbine including a stator and a rotor, a thrust bearing for each rotor fixed to the corresponding stator, a frame connecting the stators, and tie means for coupling the rotors for transmission of thrust therebetween opposing the end thrusts of the respective rotors including elastic means yieldable to accommodate axial expansion of the engine.

References Cited in the file of this patent

UNITED STATES PATENTS

| | | |
|---|---|---|
| 1,670,452 | Kaehler | May 22, 1928 |
| 1,883,930 | Junggren | Oct. 25, 1932 |
| 2,198,826 | Lansing et al. | Apr. 30, 1940 |
| 2,219,937 | Ponomareff | Oct. 29, 1940 |
| 2,296,701 | Butler | Sept. 22, 1942 |
| 2,409,323 | Torresen | Oct. 15, 1946 |
| 2,425,177 | Cronstedt | Aug. 5, 1947 |
| 2,452,782 | McLeod et al. | Nov. 2, 1948 |
| 2,516,066 | McLeod et al. | July 18, 1950 |
| 2,550,580 | McLeod et al. | Apr. 24, 1951 |
| 2,584,899 | McLeod | Feb. 5, 1952 |
| 2,598,780 | Garnier | June 3, 1952 |
| 2,614,385 | Feilden | Oct. 21, 1952 |

FOREIGN PATENTS

| | | |
|---|---|---|
| 263,388 | Switzerland | Nov. 16, 1949 |
| 599,829 | Great Britain | Mar. 22, 1948 |